(12) United States Patent
Zhang et al.

(10) Patent No.: US 12,425,185 B2
(45) Date of Patent: Sep. 23, 2025

(54) CONFIDENTIAL COMPUTING-BASED METHOD FOR CUSTOMIZEDLY BALANCING BETWEEN SECURITY AND PERFORMANCE OF HOMOMORPHIC ENCRYPTION

(71) Applicant: Nanhu Laboratory, Jiaxing (CN)

(72) Inventors: Lei Zhang, Jiaxing (CN); Jinhao Yu, Jiaxing (CN); Jiachun Liao, Jiaxing (CN); Zehao Li, Jiaxing (CN); Panpan Tang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 19/004,215

(22) Filed: Dec. 28, 2024

(65) Prior Publication Data
US 2025/0247206 A1 Jul. 31, 2025

(30) Foreign Application Priority Data
Jan. 31, 2024 (CN) .......................... 202410134408.1

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC .............................. H04L 9/008; H04L 9/0618
See application file for complete search history.

(56) References Cited

U.S. PATENT DOCUMENTS

| | | | |
|---|---|---|---|
| 10,521,419 B1 * | 12/2019 | Swamy | G06Q 10/0639 |
| 2005/0102398 A1 * | 5/2005 | Zhang | H04L 69/329 |
| | | | 709/225 |

(Continued)

FOREIGN PATENT DOCUMENTS

CN 116821929 A 9/2023

OTHER PUBLICATIONS

Chinese First Office Action with English Translation, Application No. 202410134408.1, Issue No. 2024040301421140, Applicant: Nanhu Laboratory, Title: Confidential Computing-Based Method for Customizedly Balancing Between Security and Performance of Homomorphic Encryption, Dated: Apr. 3, 2024.

(Continued)

*Primary Examiner* — Meng Li
(74) *Attorney, Agent, or Firm* — Reising, Ethington, P.C.

(57) ABSTRACT

Provided is a confidential computing-based method for customizedly balancing between security and performance of homomorphic encryption, including the following steps: receiving a computing task, security and performance custom parameters, and encrypted computing data; when a user performs security customization, dividing the computing data into multiple security levels according to the security custom parameters, and according to the security levels of data involved in computing, executing partial corresponding computing task outside a trusted execution environment, and executing partial computing task in the trusted execution environment; when the user performs performance customization, dynamically allocating resources according to the performance custom parameters, executing partial computing task in the trusted execution environment, and executing partial computing task outside the trusted execution environment; and finally, returning a computing result to a request side.

9 Claims, 4 Drawing Sheets

(56) References Cited

U.S. PATENT DOCUMENTS

| | | | | |
|---|---|---|---|---|
| 2010/0169490 A1* | 7/2010 | McNair | ............... | G06F 9/5083 |
| | | | | 709/226 |
| 2014/0348326 A1* | 11/2014 | Meyer | ................. | H04L 9/008 |
| | | | | 380/255 |
| 2022/0116215 A1* | 4/2022 | Leggette | ............ | H04L 63/0428 |

OTHER PUBLICATIONS

Chinese Notification to Grant Patent Right for Invention with English Translation, Application No. 2024101344 08.1, Issue No. 2024042600238140, Applicant: Nanhu Laboratory, Title: Confidential Computing-Based Method for Customizedly Balancing Between Security and Performance of Homomorphic Encryption, Dated: Apr. 26, 2024.

\* cited by examiner

CONFIDENTIAL COMPUTING-BASED METHOD FOR CUSTOMIZEDLY BALANCING BETWEEN SECURITY AND PERFORMANCE OF HOMOMORPHIC ENCRYPTION

CROSS-REFERENCE TO RELATED APPLICATION

This patent application claims the benefit and priority of Chinese Patent Application No. 202410134408.1 filed with the China National Intellectual Property Administration on Jan. 31, 2024, the disclosure of which is incorporated by reference herein in its entirety as part of the present application.

TECHNICAL FIELD

The present disclosure belongs to the technical field of homomorphic encryption algorithms and confidential computing, and in particular to a confidential computing-based method for customizedly balancing between security and performance of homomorphic encryption

BACKGROUND

Privacy computing or confidential computing based on Central Processing Unit (CPU) level is one of the most advanced technologies emerging in the field of information security in recent years, which refers to trusted execution environment of trusted computing base based on chip-level, is not controlled by system layer and kernel layer (that is, the data and operation in this secure environment can not be viewed, tampered with and controlled even with the highest administrative privilege of a computer system or kernel-level control right), thus ensuring the security of data privacy protection and the credibility of operation in the trusted execution environment. At present, the corresponding technologies include Intel Software Guard Extension (SGX), AMD Secure Encrypted Virtualization (SEV), ARM Confidential Compute Architecture (V9CCA), etc. The confidential computing technology has been widely used in general chips and integrated into general-purpose computers and servers in the market, such as Intel Xeon servers and HYGON third-generation servers. Therefore, the confidential computing/privacy computing based on CPU level is based on the current general chips (such as Intel general-purpose chip based on Intel SGX technology). Meanwhile, the confidential computing/privacy computing based on CPU level have two most important features as follows.

Homomorphic encryption (HE) is a special encryption technology, which allows to perform computing in an encrypted state and perform operation on the encrypted data without decrypting the data first. This means that after the encrypted data is operated, the result of decryption is about to be matched with the result of the same operation on the original data. Homomorphic encryption not only protects privacy and security, but also allows the computing in a case of encrypted the data, which is of a great significance in the fields of cloud computing and secure multi-party computing. The homomorphic encryption is of a great significance for processing sensitive information and private data safely due to its support to the computing in the encrypted state.

However, the existing homomorphic computing cannot be truly implemented in the practical applications due to low performance. The trusted execution environment (TEE) technology can accelerate the computing of homomorphic computing technology, and greatly improve the performance of the homomorphic computing, and thus the homomorphic computing can be integrated with practical applications. However, the TEE technology may suffer side channel attack theoretically, and depends on hardware manufacturers. Therefore, there are security and performance considerations between the HE computing and TEE.

SUMMARY

For the above problem, in order to optimize the performance of homomorphic encryption technology using confidential computing technology, the present disclosure provides a confidential computing-based method for customizedly balancing between security and performance of homomorphic encryption, thereby satisfying a personalized balance requirement of the user for the security and performance.

A confidential computing-based method for customizedly balancing between security and performance of homomorphic encryption includes following steps:

receiving a computing task, a security custom parameter and a performance custom parameter, and encrypted computing data; customizing one of security and performance by a user based on corresponding one of the security custom parameter and the performance custom parameter;

when security customization is performed by the user, dividing computing data into a plurality of security levels according to the security custom parameter, and according to the security levels of data involved in computing, executing partial corresponding computing task outside a trusted execution environment, and executing partial computing task in the trusted execution environment;

when performance customization is performed by the user, dynamically allocating resources according to the performance custom parameter, executing partial computing task in the trusted execution environment, and partial computing task outside the trusted execution environment with a performance requirement customized by the user being satisfied; and returning a computing result to a request side.

In the confidential computing-based method for customizedly balancing between security and performance of homomorphic encryption, the encrypted computing data is divided into three security levels according to the security custom parameter, including plaintext data, sensitive data, and top-secret data.

The computing task includes multiple subtasks.

For a subtask involving only the plaintext data, plaintext computing is performed in plaintext form outside the trusted execution environment.

For a subtask involving the sensitive data but not the top-secret data, computing is performed in plaintext form in the trusted execution environment.

For a subtask involving the top-secret data, homomorphic encryption computing is performed outside the trusted execution environment.

In the confidential computing-based method for customizedly balancing between security and performance of homomorphic encryption, when a computing data of a subtask does not involve the top-secret data, the trusted execution environment receives an encryption key of computing data of a current subtask and performs trusted sealing.

In the confidential computing-based method for customizedly balancing between security and performance of homomorphic encryption, for the subtask involving the sensitive data but not the top-secret data, a normal computing operation is performed outside the trusted execution environment by means of homomorphic encryption computing, and a denoising operation is performed in plaintext form in the trusted execution environment.

For the subtask involving the top-secret data, all operations are performed outside the trusted execution environment by means of homomorphic encryption computing.

The normal computing operation refers to other operations except a bootstrapping denoising operation. A nonlinear operation and the denoising operation have the greatest computing performance increases. Due to the limited TEE resource and high degree of confidentiality involved in nonlinear operation, the normal computing operation is still performed in a normal environment, and the denoising operation is executed in the trusted execution environment. This way has the highest performance improvement and the least security influence.

In the confidential computing-based method for customizedly balancing between security and performance of homomorphic encryption, the method further includes following steps:

when the security customization is performed by the user, if the number of multiplications of the current subtask reaches a predetermined value, starting the denoising operation;

if the current subtask involves the sensitive data but not the top-secret data, upon starting the denoising operation, sending a latest computing result and/or corresponding computing data into the trusted execution environment for denoising, and then re-encrypting the computing result and/or corresponding data denoised for continuously performing homomorphic encryption computing outside the trusted execution environment;

if the current subtask involves the top-secret data, after starting the denoising operation, continuously performing the denoising operation of the homomorphic encryption computing outside the trusted execution environment; and if the current subtask only involves the plaintext data, performing plaintext computing outside the trusted execution environment after sending the corresponding computing data into the trusted execution environment for decryption.

In the confidential computing-based method for customizedly balancing between security and performance of homomorphic encryption, the trusted execution environment receives an encryption key of the computing data and performs trusted sealing. At this time, the performance customization is performed by the user, the encryption keys generated by a system for the subtasks may be the same or different encryption keys.

In the confidential computing-based method for customizedly balancing between security and performance of homomorphic encryption, the performance custom parameters include a performance threshold, and resources are allocated dynamically through following ways:

acquiring multiple computing operators of a current computing task, where each subtask includes one or more computing operators;

acquiring a predetermined performance parameter table of the current computing task, where the predetermined performance parameter table includes HE computation time, TEE computation time and computation time difference of each computing operator, the HE computation time and TEE computation time of each computing operator are obtained in advance by testing, which may be obtained by testing when a TEE homomorphic computing server is created, or obtained by testing in other stages, and in a word, the HE computation time and TEE computation time are obtained before the current computing task is started; and computation time difference is directly obtained by subtraction;

dynamically allocating resources according to the predetermined performance parameter table to generate a plurality of pre-allocation schemes, and determining an optimal allocation scheme according to a performance enhancement factor P of each pre-allocation scheme;

$$P = \frac{T_{HE}(M_{i \leq m})}{T_{HE}(M_{i \leq m}) - T(M_{i \leq m})};$$

where $M_{i \leq m}$ denotes time consumption of a whole computing task of a corresponding allocation scheme, $T_{HE}(M_{i \leq m})$ denotes time consumption of homomorphic encryption computing for the whole computing task, and $T(M_{i \leq m})$ denotes time capable of saved by a corresponding pre-allocation scheme.

In the confidential computing-based method for customizedly balancing between security and performance of homomorphic encryption, a performance enhancement factor P which is greater than or equal to the performance threshold and is the smallest among the plurality of pre-allocation schemes is selected, and the pre-allocation scheme corresponding to selected performance enhancement factor P is determined as a final scheme.

Each corresponding computing operator is executed in one of the trusted execution environment and outside the trusted execution environment according to determined allocation scheme.

In the confidential computing-based method for customizedly balancing between security and performance of homomorphic encryption, multiple pre-allocation schemes are generated through following ways.

Time consumption reduction of each computing operator of the current computing task is computed according to the predetermined performance parameter table.

The computing operators are arranged in a descending order according to the time consumption reduction to obtain an operator queue, and top $Z_x$-$Z_y$ computing operators with biggest time consumption reduction are allocated into the trusted execution environment to obtain a pre-allocation scheme A, where Z has no special meaning, and denotes the computing operator; $Z_x$ and $Z_y$ denote a $x^{-th}$ computing operator and a $y^{-th}$ computing operator, respectively, and x and y may be determined according to an actual situation. For example, the x and y may be 1 and 2, respectively, that is, two computing operators with the biggest time consumption reduction are allocated, the x and y may be other numerical values, for example, x may also be 2, 3, 4, etc., y may also be 3, 4, 5, etc., and y is greater than x and less than the total number of computing operators, which is not specifically limited here;

The performance enhancement factor P of the pre-allocation scheme A is computed, if the performance enhancement factor P of the pre-allocation scheme A is greater than the performance threshold, one computing operator is taken out from y−x+1 computing operators among the top $Z_x$-$Z_y$ computing operators arbitrarily or according to a predetermined rule to obtain a new pre-allocation scheme B1, for example, if a $Z_x^{-th}$ computing operator is taken out, in the pre-allocation scheme B1, the computing operators executed in the trusted execution environment include $Z_{x+1}$-$Z_y$ computing operators. If the performance enhancement factor P of the pre-allocation scheme A is less than the performance threshold at the moment, the pre-allocation scheme A is determined as the final scheme. If the performance enhancement factor P of the new pre-allocation scheme B1 is greater than the performance threshold, one computing operation is continuously taken out from remaining computing operators of $Z_x$-$Z_y$ computing operators arbitrarily or according to the predetermined rule to obtain a new pre-allocation scheme B2, and if the performance enhancement factor P of the new pre-allocation scheme B1 is less than the performance threshold at the moment, the new pre-allocation scheme B1 is determined as the final scheme. If the performance enhancement factor P of the new pre-allocation scheme B2 is greater than the performance threshold, one computing operator is continuously taken out from the remaining computing operators of $Z_x$-$Z_y$ computing operators arbitrarily or according to the set rule to obtain a new pre-allocation scheme B3 . . . , which is repeated in a same manner until the performance enhancement factor P of the latest pre-allocation scheme is less than or equal to the performance threshold. In other words, the pre-allocation scheme A is set as a current pre-allocation scheme, steps of determining the performance enhancement factor P of the current pre-allocation scheme greater than the performance threshold, and taking out one computing operator to obtain a new pre-allocation scheme, and setting the new pre-allocation scheme as the current pre-allocation scheme are repeated until the performance enhancement factor P of the latest pre-allocation scheme is less than or equal to the performance threshold. If the performance enhancement factor P of the latest pre-allocation scheme is less than the performance threshold, a previous pre-allocation scheme of the latest pre-allocation scheme is determined as the final scheme. If the performance enhancement factor P of the latest pre-allocation scheme is equal to the performance threshold, the latest pre-allocation scheme is determined as the final scheme. The predetermined rule is determined by those skilled in the art, and thus will not be specifically descried in detail here. For example, the computing operator with the biggest time consumption reduction or the least time consumption reduction can be taken out.

If the performance enhancement factor P of the current pre-allocation scheme is less than the performance threshold, the $Z_{x-1}^{-th}$ computing operator or $Z_{y+1}^{-th}$ computing operator in the operator queue is taken out according to the predetermined rule and then allocated into the trusted execution environment to obtain a new pre-allocation scheme C1, if the performance enhancement factor P of the new pre-allocation scheme C1 is still less than the performance threshold at the moment, a computing operator (at this time, the computing operator is the $Z_{x-2}^{-th}$ or $Z_{y+2}^{-th}$ computing operator in the operator queue) is continuously taken out according to the predetermined rule from both sides of the operator queue of the $Z_x$-$Z_y$ computing operators to be allocated into the trusted execution environment to obtain a new pre-allocation scheme C2 . . . which is repeated in a same manner. The computing operators are taken out from both sides of the operator queue of the $Z_x$-$Z_y$ computing operators in turn until the performance enhancement factor P is greater than or equal to the performance threshold, and then the current pre-allocation scheme is used as the final scheme. In other word, steps of determining the performance enhancement factor P of the current pre-allocation scheme less than the performance threshold, and taking out computing operators to obtain a new pre-allocation scheme, and setting the new pre-allocation scheme as the current pre-allocation scheme are repeated until the performance enhancement factor P of the latest pre-allocation scheme is greater than the performance threshold, and the latest pre-allocation scheme is determined the final scheme.

If the performance enhancement factor P of the current pre-allocation scheme is less than or equal to the performance threshold, the pre-allocation scheme A is determined as the final scheme.

In practical application scenarios, the pre-allocation scheme may also be generated in other ways and the corresponding pre-allocation scheme can be selected as the final scheme. Preferably, the TEE resources are allocated in a way that an operator with bigger reduction in computation time T has higher priority, to gain TEE resources, and then multiple pre-allocation schemes are generated by combining the predetermined performance parameter table.

In the confidential computing-based method for customizedly balancing between security and performance of homomorphic encryption, the method further includes following steps:

after receiving the encrypted computing data, if the homomorphic encryption computing is executed outside the trusted execution environment, using the encrypted computing data to participate in the homomorphic encryption computing;

if corresponding computing is executed in the trusted execution environment, decrypting, by the trusted execution environment, the corresponding computing data with an encryption key acquired in advance, and then performing plaintext computing;

receiving the computing data encrypted by a request side with the encryption key, and a required encryption key, where the encryption key cannot be provided to a TEE homomorphic computing server only when the security customization is performed by the user and the computing task involves the top-secret data;

generating an encryption key of each subtask by the request side for the subtask, where encryption keys of respective subtasks are one of same and different, when computing data of a certain subtask involves the top-secret data, the encryption key of the certain subtask is different from those of other subtasks; and after the current computing task is completed, returning one or more encrypted computing results to the request side for decrypting by the request side with a corresponding encryption key or a private key of the corresponding encryption key, thus acquiring a plaintext computing result.

The present disclosure has the advantages that:

1. The idea of security and performance customization of homomorphic encryption computing is put forward, which, compared with a homomorphic encryption computing mode fixed by the system in the prior art, can achieve the balance between security and performance customized by the user and meet the individual needs of the user.

2. Two customization methods are provided, including security and performance, such that the user can customize the balance between security and performance with a focus on the security, or customize the balance between security and performance with a focus on the performance.

3. When the security is focused on, a computing position and a mix of plaintext and ciphertext computing method of the corresponding operation are allocated according to the security level of the data, thus achieving the performance optimization effect under the premise of meeting the security requirements of the user.

4. When the performance is focused on, the resources are dynamically allocated according to the user-defined performance threshold, the highest data security is ensured under the premise of meeting performance requirements, and the security and performance preferences of the user are satisfied.

5. Through above means, a flexible solution with security and performance capable of being customized by the user to satisfy the special security requirements or special performance requirements of the user is provided.

6. According to the security level or performance requirements of data, the denoising operation is allocated, which not only denoises the homomorphic encryption computing process using the trusted execution environment, but also can ensure that the security and computing performance of the homomorphic encryption computing satisfy the needs of the user, including the security requirements of top-secret data and the performance requirements of the handling process of the whole computing task.

DETAILED DESCRIPTION OF THE EMBODIMENTS

The present disclosure is further described in detail below with reference to accompanying drawings and specific embodiments.

Figure 1:
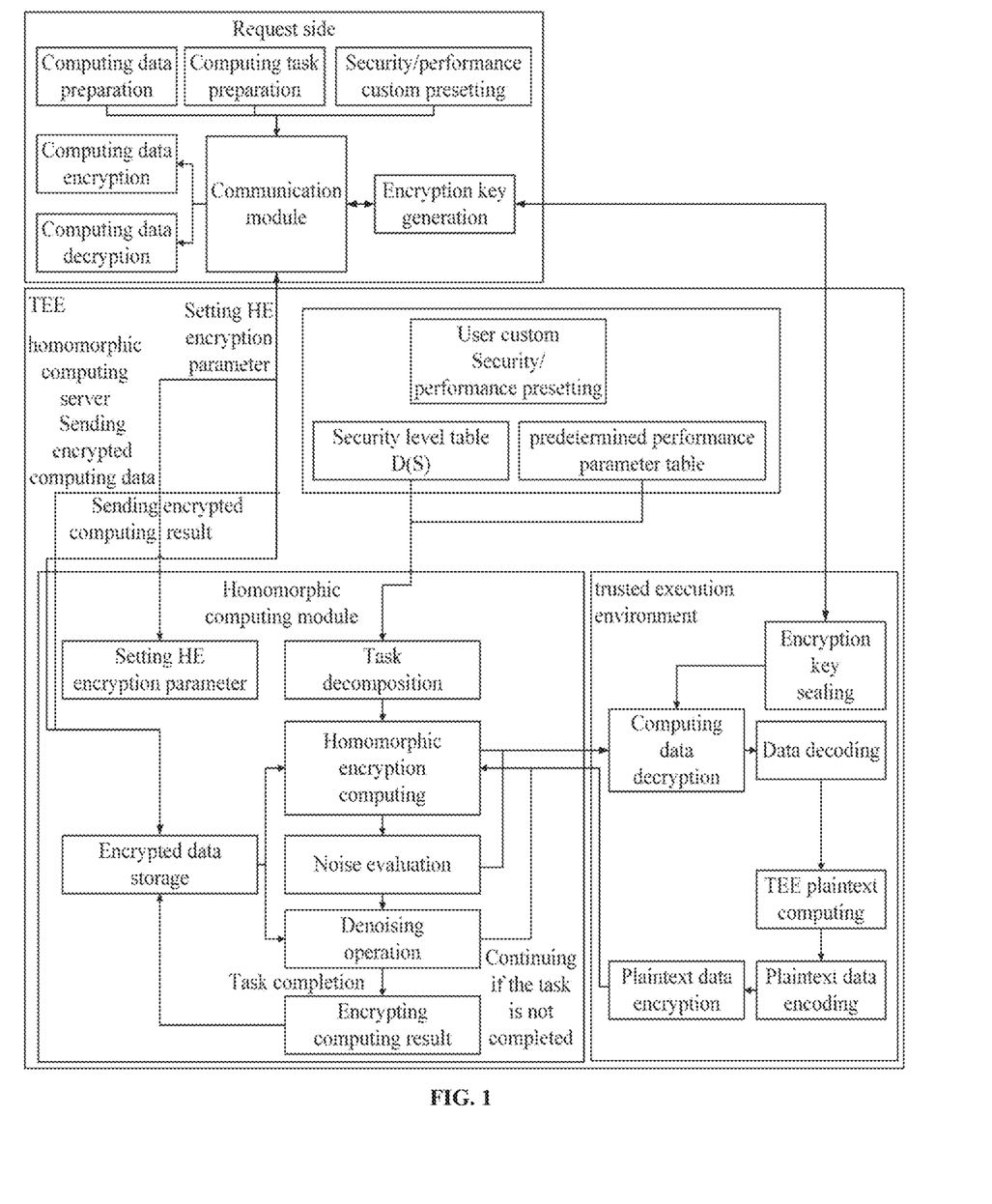
FIG. 1 is an implementation block diagram of the confidential computing-based method for customizedly balancing between security and performance of homomorphic encryption according to the present disclosure.

As shown in FIG. 1, this scheme provides a confidential computing-based method for customizedly balancing between security and performance of homomorphic encryption, relating to a TEE homomorphic computing server. The TEE homomorphic computing server is mainly used to provide a homomorphic encryption computing service for a request side according to a request from the request side, while the homomorphic encryption computing service employs TEE as the means for performance improvement. However, in the process of improving the performance, because the TEE may suffer from side channel attack theoretically, it is necessary to sacrifice some security. In general, the computing has the best performance when all placed in the TEE, but due to the possibility of the side channel attack, it is relatively the least secure. All homomorphic encryption operations are the safest, but the performance is also the worst. In this scheme, a concept of performance and security customization of homomorphic encryption is proposed, which provides a means for achieving resource allocation based on customization while providing a homomorphic encryption computing service with security and performance customization. The handling position of the computing task is specifically coordinated according to the custom demands of the user, thus achieving the custom balance between security and performance in the homomorphic encryption computing.

Specifically, in this embodiment, a request side executes the following steps:

generating or acquiring a computing task $M_{i \leq n}\{m_1, m_2, m_3, \ldots, m_n\}$, where M represents computing task, i=1, 2, 3 . . . , k, and $m_i$ denotes the $i^{-th}$ subtask;

preparing computing data $D_{i \leq n}\{d_1, d_2, d_3, \ldots, d_n\}$ of the computing task, where i=1, 2, 3 . . . n, and $d_i$ denotes the $i^{-th}$ data set.

The execution of the subtask $m_i$ involves partial data in a data set D, it is assumed that $d_i \in D$, $d_i$ is the computing data of the subtask $m_i$, which is expressed as $m_i=f(d_i, crypt_{ctx}^i, N_{muti})$, where $Crypt_{ctx}^i$ denotes homomorphic computing encryption parameters of the $i^{-th}$ subtask, abbreviated as the HE encryption parameters, including any of these parameters (when the user selects security customization, the security level exists, and when the user performs performance customization, there is no security level), such as security level, ring dimension, layer budget, multiplication depth, bootstrapping depth, rotation index, etc. $N_{muti}$ represents the number of multiplications performed by this subtask, and the parameter decides the denoising operation of the homomorphic computing.

Figure 2:
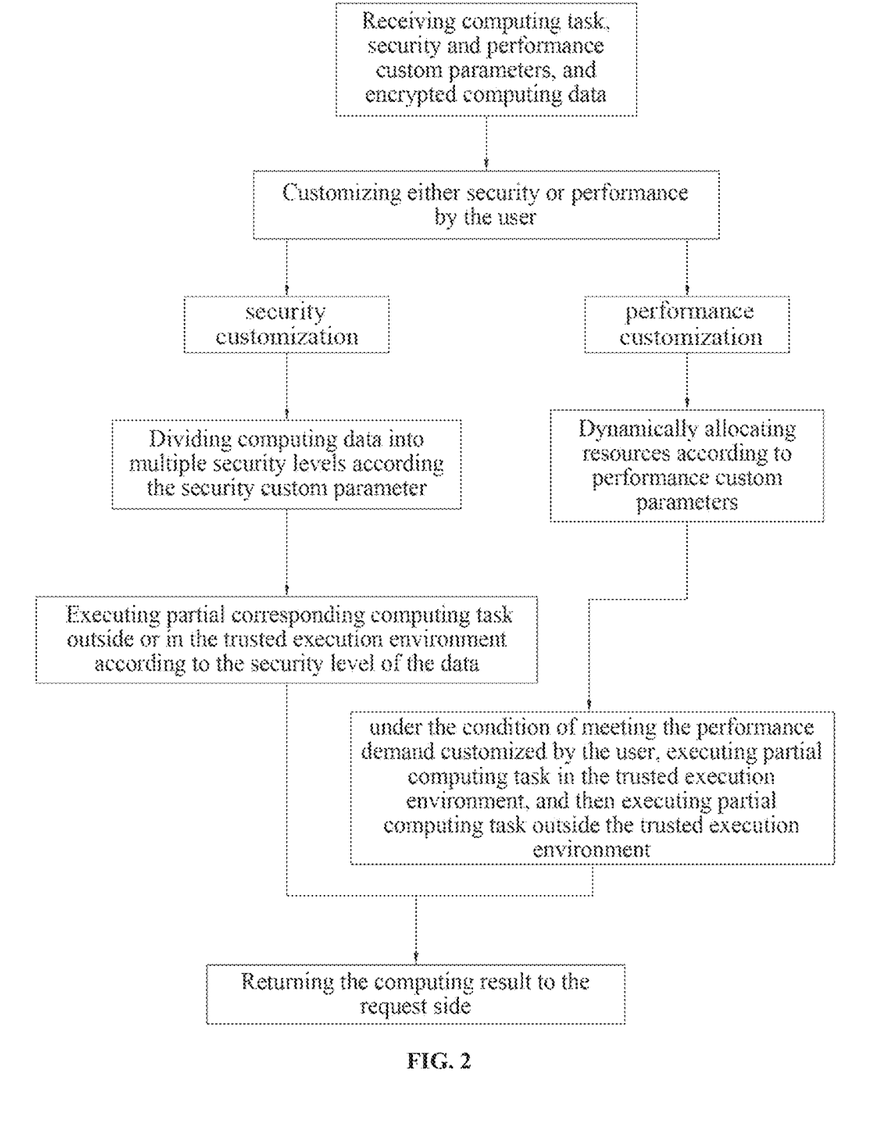
FIG. 2 is a method flow chart of the confidential computing-based method for customizedly balancing between security and performance of homomorphic encryption according to the present disclosure.

After the computing data and the computing task are prepared, the user describes the security and performance demands for the homomorphic encryption computing, as shown in FIG. 2, there are two options.

Option 1:

The user selects security customization, and gives a data security level table D(S) for the computing data, which is expressed as:

$$D_{i' \leq k}(S_{j \in [1,3]})\{d_1(s_j), d_2(s_j), d_3(s_j), \ldots, d_k(s_j)\},$$

where i'=1,2,3, . . . , k, and $d_{i'}$ represents the i-h data set.

Plaintext data $S_1$: non-sensitive data, which supports the computing in the plaintext form.

Sensitive data $S_2$: sensitive data, which supports the denoising operation to be computed in the plaintext form in the TEE.

Top-secret data $S_3$: top-secret data, which only supports homomorphic computing in a ciphertext mode.

Option 2: the user selects the performance customization, and provides the least performance threshold. The TEE homomorphic computing server allocates resources according to the performance threshold and a predetermined performance parameter table. The predetermined performance parameter table is obtained by the TEE homomorphic computing server through standardized testing. The predetermined performance parameter table includes IE computation time, TEE computation time and reduction in computation time of each computing operator. One computing task includes multiple subtasks, and each subtask includes one or more computing operators. The division of the subtasks can be performed by the request side, that is, the request side provides a computing task composed of the subtask sets to the TEE homomorphic computing server. The HE computation time and TEE computation time of each computing operator are obtained by testing, and the time reduction is obtained directly by subtraction. An instance is provided in the following table:

TABLE 1

Predetermined performance parameter table

| Homomorphic computing operator | HE computation time $T_{HE}$ | TEE computation time $T_{TEE}$ | Reduction in computation time T |
|---|---|---|---|
| Linear addition | $T_{HE}$(add) | $T_{TEE}$(add) | $T_{HE}$(add) − $T_{TEE}$(add) |
| Linear multiplication | $T_{HE}$(muti) | $T_{TEE}$(muti) | $T_{HE}$(muti) − $T_{TEE}$(muti) |
| Relinearization | $T_{HE}$(relinearize) | $T_{TEE}$(relinearize) | $T_{HE}$(relinearize) − $T_{TEE}$(relinearize) |
| Bitwise rotation | $T_{HE}$(rotate) | $T_{TEE}$(rotate) | $T_{HE}$(rotate) − $T_{TEE}$(rotate) |
| Complex conjugate (only CKKS) | $T_{HE}$(CC) | $T_{TEE}$(CC) | $T_{HE}$(CC) − $T_{TEE}$(CC) |
| Bootstrap denoising operation | $T_{HE}$(bootstrap) | $T_{TEE}$(bootstrap) | $T_{HE}$(bootstrap) − $T_{TEE}$(bootstrap) |
| Nonlinear computing task (e.g., comparison, taking the maximum value/taking the minimum value, etc.) | $T_{HE}$(nonlinear) | $T_{TEE}$(nonlinear) | $T_{HE}$(nonlinear) − $T_{TEE}$(nonlinear) |

According to Table 1, the performance enhancement factor P of the pre-allocation scheme can be obtained through the following equation:

$$P = \frac{T_{HE}(M_{i \leq m})}{T_{HE}(M_{i \leq m}) - T(M_{i \leq m})}$$

where $M_{i \leq n}$ denotes time consumption of the whole computing task of a corresponding pre-allocation scheme, $T_{HE}(M_{i \leq n})$ denotes the time consumption when the whole computing task adopts homomorphic encryption computing, and $T(M_{i \leq n})$ denotes time saved by the corresponding pre-allocation scheme.

The application scenario of this scheme is free of doing the work related to task scheduling, and the correlation and parallel handling of the computing tasks M(i≤n) are not considered here.

After the user completes the preparation of the computing task and the computing data, the TEE homomorphic computing server provides the user with homomorphic encryption computing services with customizedly balancing between security and performance through the following methods.

The user side sends the to-be-performed computing task $M_{i \leq k}\{m_1, m_2, m_3 \ldots, m_k\}$ to the TEE homomorphic computing server in an encrypted transmission protocol (e.g., Transport Layer Security (TLS)). The TEE homomorphic computing server, after receiving the computing task M, initializes a homomorphic encrypted computing environment $HE_{CTX}^i$ according to homomorphic computing encryption parameters $crypt_{ctx}^i$ of the subtask, and then $HE_{CTX}^i$ is sent to the request side. The request side generates an encryption key $sk_i$ according to the $HE_{CTX}^i$, and encrypt the computing data $d_i$ involved in the task $m_i$ with the $sk_i$ to generate ciphertext $C_i$. Finally, the encrypted computing data is provided to the TEE homomorphic computing server. The request side may generate different encryption key for the computing data corresponding to each computing task, or generate the same encryption key. During the security customization, it is preferred that the request side generates different encryption keys for the computing data corresponding to the computing tasks.

The user side submits the security and performance customization parameters to the TEE homomorphic computing server.

Figure 3:
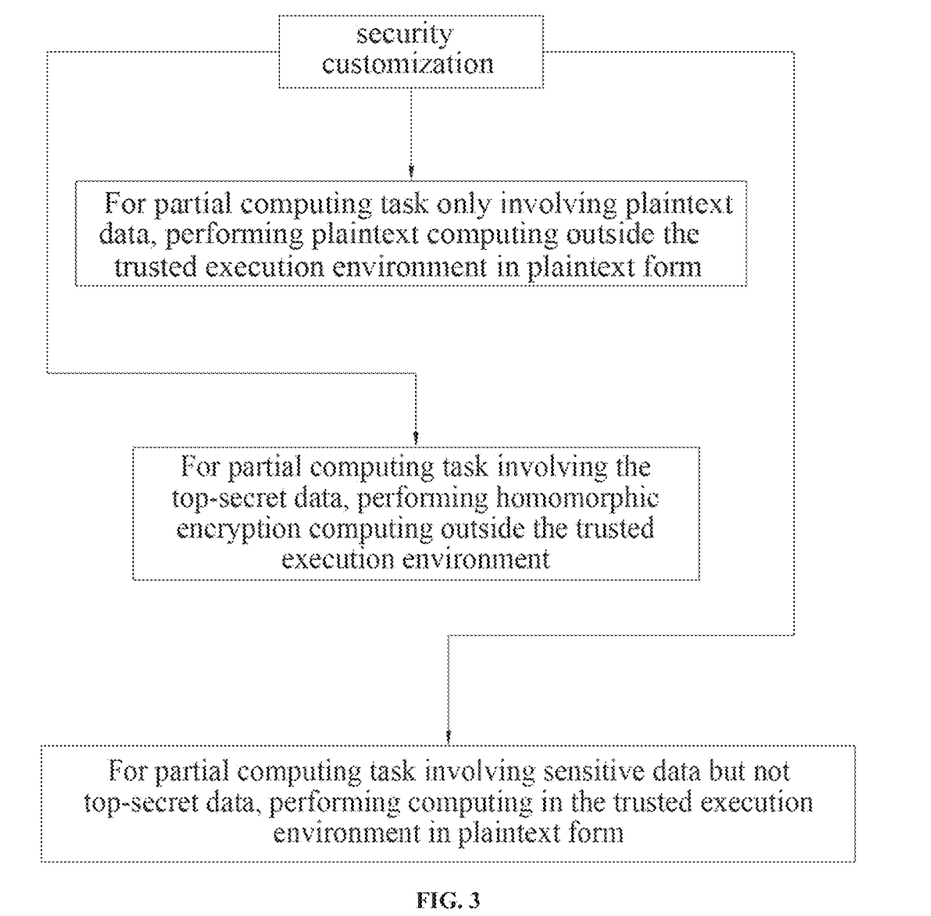
FIG. 3 is a flow chart of a method for balancing security and performance based on security customization in the confidential computing-based method for customizedly balancing between security and performance of homomorphic encryption according to the present disclosure.

As shown in FIG. 3, when the user performs the security customization, the computing data is divided into multiple security levels according to the security customization parameters, and according to the security level of data involved in computing, partial corresponding computing task is executed outside or in the trusted execution environment. In this embodiment, the data is divided into three security levels according to the security customization parameters, i.e., plaintext data, sensitive data, and top-secret data. In practical applications, the data is not limited to be divided to these three types, which may be divided into two or more types.

When the computing data $d_i$ of the subtask $m_i$ does not involve the top-secret data, the trusted execution environment is enabled to receive the encryption key of the computing data of the current subtask and seal the encryption key in a trusted manner for later use.

For the subtask $m_i$ only involving the plaintext data, the computing data $d_i$ is the plaintext data, which is not affected by the noise, and there is no need to perform denoising operation. The corresponding computing data can be subjected to plaintext computing outside the trusted execution environment after being sent into the trusted execution environment for decryption. At this time, if the computing result needs to be returned to the request side, the computing result can be directly returned to the request side, or can be returned to the request side after being encrypted in the trusted execution environment.

When the subtask involves the top-secret data or the sensitive data, the denoising operation is required. For the homomorphic encryption computing, the nonlinear operation and the denoising operation are the most expensive in computing performance, and due to the limited TEE resource and high degree of confidentiality involved in nonlinear operation, in this embodiment, all operations for the sub-tasks involving the top-secret data are performed outside the trusted execution environment by means of homomorphic encryption computing. When the number of multiplications reaches a predetermined value and denoising is required, corresponding bootstrapping denoising operation is performed according to an algorithm function types Bost/Gentry/Vercauteren/Brakerski/Fan-Vercauteren (BGV/BFV), Cheon-Kim-Kim-Song (CKKS), Fully Homomorphic Encryption Algorithm/Fast Fully Homomorphic Encryption over the Torus (FHEW/TFHE), etc.) in $HE_{CTX}^i$.

For the subtask involving the sensitive data but not the top-secret data, the normal computing operation is performed outside the trusted execution environment by means of homomorphic encryption computing, and the denoising operation is performed in the trusted execution environment in the plaintext form. In this way, the performance is improved the most and the security impact is minimal. The specific implementation method is as follows:

If the number of multiplications of the current subtask reaches the predetermined value $N_{muti}$, the denoising operation is started.

For the subtask $m_i$ involving the sensitive data but not the top-secret data, the computing data $d_i$ includes sensitive data, and may also include plaintext data, but does not include top-secret data. The TEE is used for denoising. The latest computing result and/or corresponding computing data are/is sent into the trusted execution environment for being computed in the plaintext form by using the sealed key in the trusted execution environment, and are/is denoised and then re-encrypted to continue homomorphic encryption computing outside the trusted execution environment. The plaintext denoising performance in the TEE environment is three orders of magnitude higher than denoising operation in the homomorphic computing, which can greatly improve the operation efficiency.

The above steps are repeated until the computing task M is completed, then the computed ciphertext (including the final computing result, or the computing results of certain/some/all subtasks in the middle as required) is sent to the request side, and the TEE environment is informed that the computing task has been completed, and the sealed encryption key is synchronously destructed.

Figure 4:
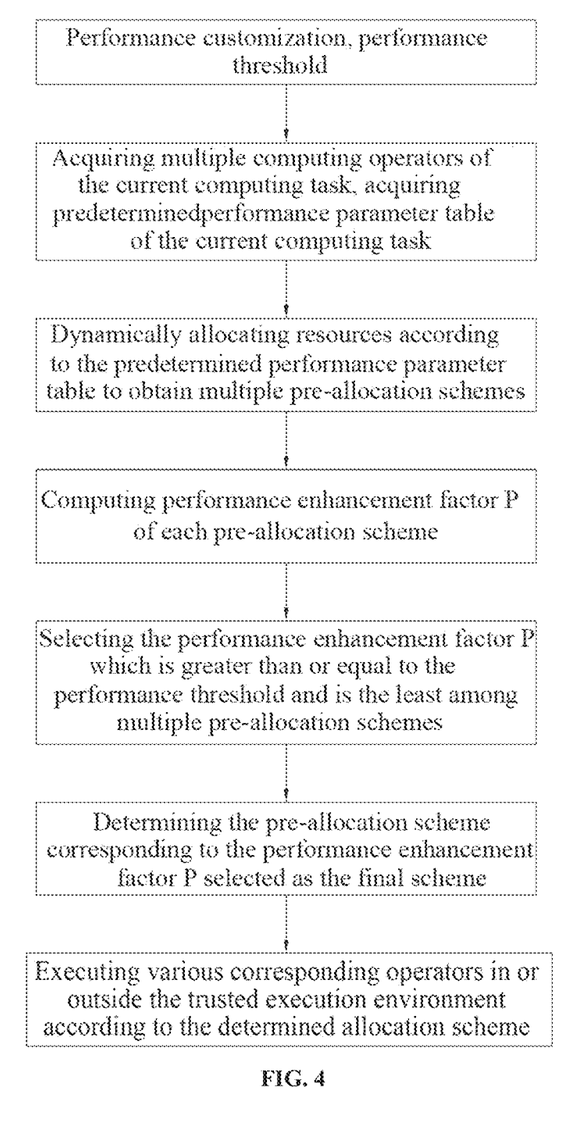
FIG. 4 is flow chart of a method for balancing security and performance based on performance customization in the confidential computing-based method for customizedly balancing between security and performance of homomorphic encryption according to the present disclosure.

As shown in FIG. 4, when the user performs the performance customization, the resources are dynamically allocated according to the performance custom parameter, thus computing partial computing task in the trusted execution environment in the plaintext form and performing partial computing task outside the trusted execution environment by means of homomorphic encryption computing under the condition of meeting the custom performance requirements of the user. The performance custom parameters include a performance threshold, and the resources are dynamically allocated through the following modes:

acquiring multiple computing operators of the computing task;
acquiring a predetermined performance parameter table of the current computing task;
dynamically allocating the resources according to the predetermined performance parameter table to generate multiple pre-allocation schemes, and determining an optimal allocation scheme according to the performance enhancement factor P of each pre-allocation scheme;
selecting the performance enhancement factor P which is greater than or equal to the performance threshold and is the smallest among the multiple pre-allocation schemes, and determining a pre-allocation scheme corresponding to the performance enhancement factor P selected as a final scheme; and
executing each corresponding computing operator in the trusted execution environment or outside the trusted execution environment according to the determined allocation scheme.

In the above allocation process, the TEE resources are allocated in a way that an operator with big reduction in computation time T has high priority, and then multiple pre-allocation schemes are generated by combining the predetermined performance parameter table. That is, the operator with small time consumption reduction T, such as a linear operation, is allocated to perform homomorphic encryption computing outside the trusted execution environment.

Different pre-allocation schemes are acquired by adjusting an execution position of the operator with big time consumption reduction T, such as bootstrap denoising operation, nonlinear operation, and then different homomorphic computing operators are allocated with the computing environments (HE environment/TEE environment) according to the performance enhancement factor P of the pre-allocation scheme to form a computing task resource allocation table, as shown in Table 2. Only all operators with big time consumption reduction T still cannot meet the performance requirements when allocated to be executed in the TEE, it is considered to allocate the operators with small time consumption reduction T to the TEE to generate multiple pre-allocation schemes. Otherwise, the pre-allocation scheme with P which is the least and greater than the performance threshold is selected from multiple pre-allocation schemes in which only operators with the big time consumption reduction T is allocated in TEE.

TABLE 2

Computing resource task allocation table

| Computing subtask | Computing operator | Computing environment |
|---|---|---|
| $m_1$ | Linear computing | HE |
| | Denoising operation | TEE |
| | Nonlinear operation | TEE |
| | ... | ... |
| $m_2$ | ... | ... |
| ... | ... | ... |
| $m_n$ | ... | ... |

When the resource is enabled or the computing task, the users side sends the encryption key of the computing data to the TEE environment on the server side, and the encryption key is sealed in the TEE using the sealing (trusted sealing) technology for later use.

Similarly, after the computing task M is completed, the ciphertext obtained by computing (including the final computing result, or the computing results of certain/some/all subtasks in the middle as required) is sent to the request side, and the TEE environment is informed that the computing task has been completed, and the sealed encryption key is destructed synchronously.

If the homomorphic encryption computing is performed outside the trusted execution environment, the encrypted computing data is used to participate in the homomorphic encryption computing. If the corresponding computing is executed in the trusted execution environment, the trusted execution environment performs plaintext computing after decrypting the required computing data with the encryption key acquired in advance.

If the computing of the current operator requires the computing results of one or more previous operators, the computing results of the corresponding one or more previous operators are also used as the computing data of the current operator. Taking Table 2 as an example, when subtask $m_1$ is executed, a linear computing operator thereof performs homomorphic encryption computing outside the trusted execution environment, while a denoising operation and a nonlinear operation are performed in the trusted execution environment by means of plaintext computing. The computing data required by the denoising operation and the nonlinear operation can be sent to the TEE, and the computing data of the subtask can be directly sent into the TEE environment, and is decrypted for corresponding computing operation. If the computing result of the linear computing is needed, the computing result of the linear computing is also sent into the TEE as the computing data of the denoising operation and the nonlinear operation to be decrypted to participate in the following computing.

If the computing result that needs to be returned to the request side is obtained in the trusted execution environment, the computing result is encrypted with the corresponding encryption key in the trusted execution environment, and then returned to the request side. If the computing result is acquired outside the trusted execution environment through homomorphic encryption computing, the computing result can be directly returned to the request side. The request side uses a corresponding decryption algorithm to decrypt the computing result based on a corresponding encryption key or a private key of the encryption key. If it is the latter, the encryption key is a public key, or a public-private key pair formed by the public key and the private key.

It should be noted that this embodiment is only an example, and the scope of protection claimed by the present disclosure is not limited to the above example, but should be subject to the claims. For example, in the above example, the computing task is divided by the request side, and in a practical application, the computing task can also be divided by the TEE homomorphic computing server according to predetermined rules. For example, the above data security level is divided into three levels, and in a practical application, the data security level can also be divided into two or more levels. For example, in the above example, the computing result is encrypted by the encryption key of the request side, and the request side can directly use its own key for decryption. In a practical application, the computing result can be encrypted by the server using other keys, and then the decryption mode and/or the decryption key is provided to the request side through in some secure form. Even in the above example, the computing result is encrypted and transmitted to the request side. In a practical application, if only the data used in the computing has privacy requirements, but the result has no privacy requirements, the result can also be sent to the request side in plaintext, and so on.

Specific embodiments described in this embodiment are only illustrative of the spirit of the present disclosure. According to the present disclosure, those skilled in the art can make various modifications or supplements to the described specific embodiments or replace them in a similar way, without departing from the spirit of the present disclosure or exceeding the scope defined in the appended claims.

What is claimed is:

1. A confidential computing-based method for customizedly balancing between security and performance of homomorphic encryption, comprising:
   receiving a computing task, a security custom parameter and a performance custom parameter, and encrypted computing data; customizing one of security and performance by a user based on corresponding one of the security custom parameter and the performance custom parameter;
   when security customization is performed by the user, dividing computing data into a plurality of security levels according to the security custom parameter, and according to the security levels of data involved in computing, executing partial corresponding computing task outside a trusted execution environment, and executing partial computing task in the trusted execution environment;
   when performance customization is performed by the user, dynamically allocating resources according to the performance custom parameter, executing partial computing task in the trusted execution environment, and partial computing task outside the trusted execution environment with a performance requirement customized by the user being satisfied; and
   returning a computing result to a request side;
   the performance custom parameter comprises a performance threshold, and resources are allocated dynamically through following ways:
   acquiring a plurality of computing operators of a current computing task;
   acquiring a predetermined performance parameter table of the current computing task, wherein the predetermined performance parameter table comprises homomorphic encryption (HE) computation time, trusted execution environment (TEE) computation time and computation time difference of each computing operator; and
   dynamically allocating resources according to the predetermined performance parameter table to generate a plurality of pre-allocation schemes, and determining an optimal allocation scheme according to a performance enhancement factor P of each pre-allocation scheme;

$$P = \frac{T_{HE}(M_{i \leq m})}{T_{HE}(M_{i \leq m}) - T(M_{i \leq m})};$$

wherein $M_{i \leq m}$ denotes the computing task, m denotes a number of a plurality of subtasks contained in the computing task; $T_{HE}(M_{i \leq m})$ denotes time consumption of homomorphic encryption computing for the computing task, and $T(M_{i \leq m})$ denotes time capable of saved by a corresponding pre-allocation scheme.

2. The method according to claim 1, wherein the computing data is divided into three security levels according to the security custom parameter, comprising plaintext data, sensitive data, and top-secret data;
   for a subtask involving only the plaintext data, plaintext computing is performed in plaintext form outside the trusted execution environment;
   for a subtask involving the sensitive data but not the top-secret data, computing is performed in plaintext form in the trusted execution environment; and
   for a subtask involving the top-secret data, homomorphic encryption computing is performed outside the trusted execution environment.

3. The method according to claim 2, wherein when computing data of a subtask does not involve the top-secret data, the trusted execution environment receives an encryption key of computing data of a current subtask and performs trusted sealing.

4. The method according to claim 3, wherein for the subtask involving the sensitive data but not the top-secrete data, a normal computing operation is performed outside the trusted execution environment by means of homomorphic encryption computing, and a denoising operation is performed in plaintext form in the trusted execution environment; and
   for the subtask involving the top-secret data, all operations are performed outside the trusted execution environment by means of homomorphic encryption computing.

5. The method according to claim 4, further comprising following steps:

when the security customization is performed by the user, if a number of multiplications of the current subtask reaches a predetermined value, starting the denoising operation;

if the current subtask involves the sensitive data but not the top-secret data, upon starting the denoising operation, sending a latest computing result and/or corresponding computing data into the trusted execution environment for denoising, and then re-encrypting the denoised computing result and/or data for continuously performing homomorphic encryption computing outside the trusted execution environment;

if the current subtask involves the top-secret data, after starting the denoising operation, continuously performing the denoising operation of the homomorphic encryption computing outside the trusted execution environment; and if the current subtask only involves the plaintext data, performing plaintext computing outside the trusted execution environment after sending the corresponding computing data into the trusted execution environment for decryption.

6. The method according to claim 1, wherein the trusted execution environment receives an encryption key of the computing data and performs trusted sealing.

7. The method according to claim 1, wherein a performance enhancement factor P which is greater than or equal to the performance threshold and is a smallest among the plurality of pre-allocation schemes is selected, and the pre-allocation scheme corresponding to the performance enhancement factor P is determined as a final scheme; and each corresponding computing operator is executed in one of the trusted execution environment and outside the trusted execution environment according to determined allocation scheme.

8. The method according to claim 7, wherein a plurality of pre-allocation schemes are generated through following ways:

computing time consumption reduction of each computing operator of the current computing task according to the predetermined performance parameter table;

arranging the computing operators in a descending order according to the time consumption reductions to obtain an operator queue, and allocating top $Z_x$-$Z_y$ computing operators with biggest time consumption reduction into the trusted execution environment to obtain a pre-allocation scheme A;

computing the performance enhancement factor P of the current pre-allocation scheme, if the performance enhancement factor P is greater than the performance threshold, taking out one computing operator from the top $Z_x$-$Z_y$ computing operators arbitrarily or according to a predetermined rule to obtain a new pre-allocation scheme B1, and if the performance enhancement factor P is less than the performance threshold at the moment, determining the pre-allocation scheme A as the final scheme; otherwise, continuing to take out one computing operator arbitrarily or according to the predetermined rule to obtain a new pre-allocation scheme B2, repeating in a same manner, until the performance enhancement factor P is less than or equal to the performance threshold; if the performance enhancement factor P is less than the performance threshold, setting a previous pre-allocation scheme as the final scheme, and if the performance enhancement factor P is equal to the performance threshold, setting the current pre-allocation scheme as the final scheme;

if the performance enhancement factor P is less than the performance threshold, allocating a computing operator from one of $Z_{x-1}$ and $Z_{y+1}$ into the trusted execution environment to obtain a new pre-allocation scheme C1, and if the performance enhancement factor P is still less than the performance threshold at the moment, continuing to take out one computing operator from both sides of the $Z_x$-$Z_y$ computing operators of the operator queue and allocating it into the trusted execution environment to obtain a new pre-allocation scheme C2, repeating in a same manner, until the performance enhancement factor P is greater than or equal to the performance threshold, and setting the current pre-allocation scheme as the final scheme; and if the performance enhancement factor P is equal to the performance threshold, determining the pre-allocation scheme A as the final scheme.

9. The method according to claim 1, further comprising following steps:

after receiving the encrypted computing data, if the homomorphic encryption computing is executed outside the trusted execution environment, using the encrypted computing data to participate in the homomorphic encryption computing;

if corresponding computing is executed in the trusted execution environment, decrypting, by the trusted execution environment, the corresponding computing data with an encryption key acquired in advance, and then performing plaintext computing;

receiving the computing data encrypted by a request side with the encryption key, and a required encryption key, wherein encryption keys of respective subtasks are one of same and different, when computing data of a certain subtask involves the top-secret data, the encryption key of the certain subtask is different from those of other subtasks; and after the current computing task is completed, returning one or more encrypted computing results to the request side for decrypting by the request side with a corresponding encryption key or a private key of the corresponding encryption key, thus acquiring a plaintext computing result.

* * * * *